Oct. 16, 1956  J. W. LOWER ET AL  2,766,627
GYROSCOPE
Filed March 7, 1955
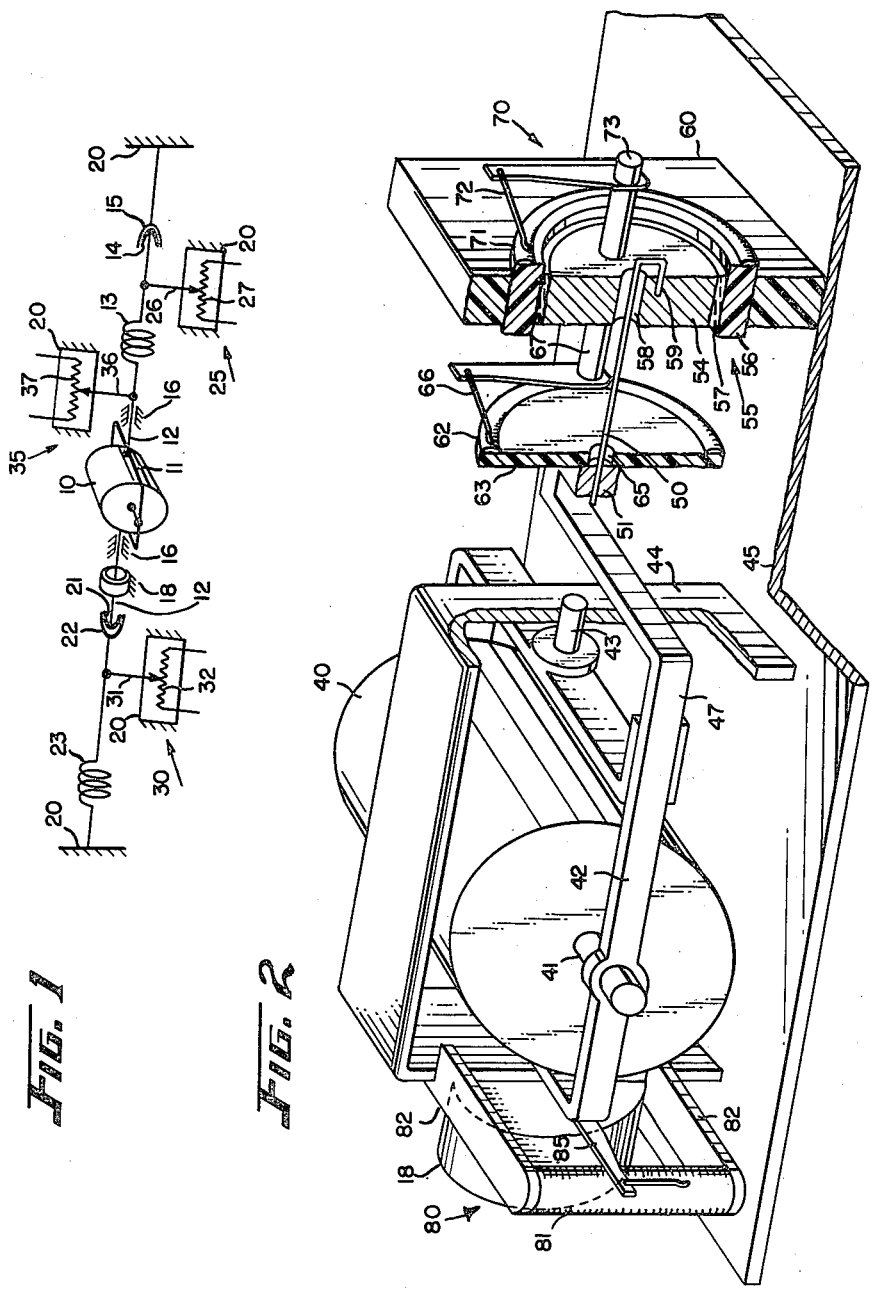
INVENTOR.
JACK W. LOWER
BY DANIEL G. TAYLOR
Joseph E. Ryan
ATTORNEY United States Patent Office 2,766,627
Patented Oct. 16, 1956

2,766,627
GYROSCOPE

Jack W. Lower, and Daniel G. Taylor, Minneapolis, Minn., assignors to Minneapolis-Honeywell Regulator Company, Minneapolis, Minn., a corporation of Delaware Application March 7, 1955, Serial No. 492,578

11 Claims. (Cl. 74—5.6)

Our invention relates to an improved gyroscope design and more particularly to a single degree of freedom gyroscope which is capable of measuring displacement and rate signals or a combined rate and displacement signal through the use of a single instrument.

Rate and displacement sensing devices and means for electrically integrating rate signals or differentiating displacement signals have been utilized in the past in connection with gyroscopic control equipment and in particular in connection with automatic pilot control of an aircraft to a large degree of recent date. With this increase in the type of automatic control which utilize gyroscopes as a primary sensing device and combined rate and displacement factors as a controlling quantity, has come greater complexity in control networks, increased number of control components and considerably greater cost or expense in control equipment. Attempts to minimize the number of controllers and simplify the control apparatus by obtaining combined rate and displacement signals from the single device have introduced complexity in the primary controller due to the addition of integrating motors and complicated mechanical structures coupled with the gyroscope for integrating gyro signals to perform this function. In the present invention we have provided for the use of a single gyroscopic device and a simplified damper associated therewith to form an arrangement by means of which separate displacement and rate signals as well as a combined rate and displacement may be obtained. This arrangement is neither complex nor expensive and is quite compact in design. It further provides the opportunity of obtaining separate rate and displacement signals which may be used separately or collectively in the operation of a control network.

It is therefore the primary object of this invention to provide an improved gyroscope design from which separate rate and displacement signals may be obtained and from which a combined rate and displacement signal may be obtained.

It is also an object of this invention to provide in a simplified single degree of freedom gyroscope the use of an elastic restraint and one or more fluid-type viscous dampers to provide damping and restraining functions and permit the integration of the gyroscope or gimbal movement to provide separate rate and displacement signals therefrom or one combined rate and displacement signal.

It is also an object of this invention to provide a simplified and improved gyroscope design which is small and compact in structure and performs a dual function of rate and displacement sensing without the addition of auxiliary complex integrating equipment.

These and other objects of this invention will become apparent from a reading of the attached description together with the drawings wherein:

Figure 1 is a schematic disclosure of our improved gyroscope design disclosing the arrangement of parts thereof, and Figure 2 is a perspective view of our improved gyroscope design with parts broken away to disclose the relationship of parts.

In Figure 1 we have shown our improved gyroscope design schematically to illustrate one arrangement of parts or form which the invention may take. The details of the gyroscope have been, for the most part, eliminated and the gyroscope is represented by a cylindrical mass 10 designed to be mounted in a gimbal 11 and pivoted for rotation therein about an axis such as the spin axis through a suitable driving means not shown. The gimbal 11 is in turn mounted on a shaft indicated at 12 to define a displacement axis for the single degree of freedom gyroscope which is journalled through bearing supports indicated at 16. In Figure 1, the right-hand extremity of the shaft 12, as shown in the drawings, is connected through a spring member 13 designed to elastically restrain the gyroscope, the spring in turn being connected to a two-part damper 14 and 15, one part of which is connected to the spring and the second part to a base or support for the gyroscope indicated schematically at 20. Also connected to shaft 12 is a command torquer shown schematically at 18 and connected to the left-hand extremity of shaft 12. The left-hand extremity of shaft 12 is further connected through a two-part damper indicated at 21, 22, the shaft 12 being connected to the part 21 of the damper, the part 22 of the damper being connected to a spring or elastic restraint indicated at 23 which in turn is connected to the support 20. With this arrangement, the spring 13 for the right-hand extremity of the gyroscope will differentiate gimbal movement or movement about the displacement axis 12—12 providing a torque at the extremity of the spring common to the damper member 14 which is proportional to rate of gyroscope displacement. Associated with this part is a signal generating device or potentiometer 25 having a wiper 26 connected to the spring and a winding 27 connected to the base 20. Thus the signal potentiometer is actually connected across the damper 14, 15 measuring movement of the damper which integrates the torque output from the spring 13 to give a displacement signal output. At the opposite extremity, the damper 21, 22 transmits torque from the gyro gimbal to the spring 23. A second signal potentiomter 30 having a wiper 31 is connected to the damper part 22 and to one extremity of the spring 23 while the winding 32 of the potentiometer 30 is connected to the support 20 and in effect across the spring 23 to measure the rate signal or relative movement of the spring differentiating the gimbal movement of the gyro. A third potentiometer 35 having a wiper 36 is connected at the wiper to the gyro gimbal 11 and has a winding 37 which is connected to the base 20 or in effect across the spring and damper 13 and 14, 15 to provide a combined signal output which is part rate and part displacement.

Thus the gyroscope will respond to input signals in the form of movement of the gyroscope about an axis normal to the spin axis and the displacement axis and will precess about the displacement axis or shaft 12 to provide rate, displacement, and combined rate and displacement signals proportional to the input movement. The command torquer 18 mounted on shaft 12 is shown schematically since its details do not make up the inventive concept herein. It will be understood, however, that any type of motive device may be utilized herein which is reversible in operation and which may move the gimbal against gyroscope rigidity for limited ranges of movement. Its use in a device of this type is largely conventional and serves to torque the gimbal in proportion to its input signal to provide a predetermined rate and displacement output. Auxiliary and associated control equipments to utilize the output signals and to return the gyro gimbal to its original position through input movements are omitted herein for simplicity since they form no part of this invention. The command torquer may also be utilized as a centering or caging device but again these details are omitted herein because they are conventional and form no part of this invention. While the command torquer is shown as connected directly to the gimbal 11, it should be understood that it may be positioned between the damper and spring without affecting the operation of the gyroscope except for possibly a slight delay in response to command signals.

In Figure 2 there is shown in perspective our improved gyroscope design in more detail and somewhat modified from the disclosure of Figure 1. For purposes of simplicity, however, many parts of the gyroscope have been omitted, such as the flex leads or slip rings and details of the spin motor together with the details of the housing and cover. In this embodiment the rotor mass is shown as a cylinder indicated at 40 which is pivotally mounted through suitable means such as pivots 41 which mount the rotating mass on a gimbal 42 through suitable bearings not shown. The details of the spin motor are omitted herein, it being understood that an electric or pneumatic motor may be utilized. The gimbal 42, in addition to mounting the rotor 40, includes pivots 43 which pivotally mount the gimbal on a frame 44 which is attached to or integral with the base 45. It is to be understood, although not shown, that suitable bearing means in the frame 44, not shown, mount the pivots 43 within the frame to support the gimbal on the frame about a displacement axis of the gyroscope. Mounted on frame 44 and connected to pivot 43 (not shown) at the left-hand extremity of gimbal 42 is a torquer indicated at 18. Torquer 18 as in Figure 1 is designed to apply torques to gimbal 42 for command or centering purposes. Its operation is largely conventional and its details, as in Figure 1, are omitted for simplicity. Attached to the gimbal 42 is a bracket 47 suitably secured thereto and L-shaped in form to clear the portion of the upstanding frame and transmit rotational movement of the gimbal relative to the frame in a manner later to be defined. Attached to the bracket 42 at the free extremity thereof is a torsion rod indicated at 50, the rod being secured to the end of the L-shaped bracket as at 51 through suitable means not shown. The opposite extremity of the rod 50 is mounted in an inner cylindrical member 54 of the cylindrical or concentric damper indicated generally at 55, an outer part of the damper being cylindrical in form as indicated at 56 and encircling the inner member 54 with a small clearance therebetween in which is positioned a viscous fluid or damping fluid indicated at 57 which fluid is held between the members by capillary action and dampens movement between the members. While we have shown capillary type dampers herein, it should be understood that the gyroscope may be of the floated type and that the damper may be immersed in the damping fluid. The inner member 54 of the damper has an aperture therethrough indicated at 58 through which the extremity of the rod extends and is bent over as at 59 to be secured to the damper member. The outer part 56 of the concentric damper member is mounted in a second frame or bracket 60 which is suitably attached by means not shown to the base 45 and mounts the damper member in a predetermined relationship with respect to the inner part of the damper 54. Thus the gimbal of the gyroscope is supported at this extremity by the pivot 43, the torsion rod or elastic restraint connected thereto restrains gimbal movement to produce a rate signal output across the restraint. The damper connected to the restraint element operates as an integrator to integrate the rate movement and produce a displacement signal between the damper parts. The opposite extremity of the gimbal, not shown, includes a second set of pivots which mount the gimbal at this point to the frame 44 through suitable bearing means.

Connected across the torsion rod or elastic restraint of the gyroscope is a signal potentiometer composed of a toroidal winding 62 suitably mounted on a disc 63 or support and attached to the L-shaped bracket member 47 through suitable means, not shown. The disc 63 has an aperture 65 therethrough to permit passage of the torsion rod 50 through the disc without contact. Cooperating with the winding to form a signal potentiometer is a wiper indicated at 66, this wiper being mounted on a pin of insulative material 67 and attached to the inner part 54 of the damper. Thus it is attached to the opposite extremity of the torsion rod and measures relative displacement or torsion of the rod to provide the rate signal output. As such, it is similar in operation to potentiometer 30 referred to in Figure 1.

Also included in the gyroscope is a second signaling device or potentiometer indicated at 70 the potentiometer having a winding 71 mounted on the outer part 56 of the damper and suitably secured thereto and insulated therefrom through suitable means, not shown. Cooperating with the winding 71 is a wiper 72 mounted on an insulative pin or shaft 73 also secured to the inner part 54 of the damper. Thus the potentiometer 70 measures relative movement of the damper parts and takes the integral of the rate movement at the extremity of the spring 50 to provide a displacement signal output. At the opposite extremity of the gimbal 42 a third signal potentiometer indicated at 80 is mounted to the frame 44 the signal generator having a winding 81 mounted to the frame 44 through suitable brackets 82 of insulative material. Associated with the winding 81 is a wiper 85 which is connected to the gimbal 47 of the gyroscope. The potentiometer 80 is similar to the potentiometer 35 shown in Figure 1 and measures relative movement of the gimbal with respect to the support or the movement across the spring and dampers respectively to provide a combined signal output which is proportional to rate plus displacement.

Thus it will be seen that our improved gyroscopic device provides a simple means for differentiating and integrating respectively the movement of the single axis gyroscope to provide first a rate signal, second a displacement signal or the integral of the rate signal and thirdly a combined rate and displacement signal from a single device through a very simple and compact arrangement of parts. It will be evident that certain changes may be made to the device within the scope of the invention and consequently we wish to be limited only by our appended claims.

We claim as our invention:

1. In a gyroscope, a rotor and spinning means therefor, gimbal means mounting said rotor for rotational movement about its spin axis, bearing means pivotally mounting said gimbal about a displacement axis normal to said spin axis and on a support for the gyroscope, a damper and a torsion rod connected to one extremity of said gimbal, the torsion rod being connected between said gimbal and said damper and said damper in part being fixed to said support for the gyroscope, signal generating means including relatively movable parts one of which is mounted on said gimbal and the other mounted on a movable portion of said damper, and a second signal generating means including relatively movable parts one part of which is mounted on the movable part of said damper and the second part of which is mounted on said support.

2. In a gyroscope, a rotor and spinning means therefor, gimbal means mounting said rotor for rotational movement about its spin axis, bearing means pivotally mounting said gimbal about a displacement axis normal to said spin axis and on a support for the gyroscope, a damper and a torsion rod connected to one extremity of said gimbal, the torsion rod being connected between said gimbal and said damper and said damper in part being fixed to said support for the gyroscope, signal generating means including relatively movable parts one of which is mounted on said gimbal and the other mounted on a movable portion of the damper, a second signal generating means including relatively movable parts one part of which is mounted on the movable part of said damper and the second part of which is mounted on said support, and a third signal generating means including relatively movable parts one part of which is mounted on said gimbal means and the other of which is mounted on said support.

3. In a gyroscope, a rotor and spinning means therefor, gimbal means mounting said rotor for rotational movement about its spin axis, bearing means pivotally mounting said gimbal about a displacement axis normal to said spin axis and on a support for the gyroscope, a damper and a torsion rod connected to one extremity of said gimbal, the torsion rod being connected between said gimbal and said damper and said damper in part being fixed to said support for the gyroscope, signal generating means including relatively movable parts one of which is mounted on said gimbal and the other mounted on a movable portion of said damper, a second signal generating means including relatively movable parts one part of which is mounted on the movable part of said damper and the second part of which is mounted on said support, a third signal generating means including relatively movable parts one part of which is mounted on said gimbal means and the other of which is mounted on said support, and torquer means connected to said support and said gimbal means.

4. In combination, a single degree of freedom gyroscope including a rotor and spinning means therefor and a gimbal means mounting said rotor for rotational movement, means mounting said gimbal rotor for limited pivotal movement on a support and about an axis normal to the axis of rotation of said rotor, elastic means connected in part to said gimbal means for restraining said limited pivotal movement of said gimbal, damping means connected in part to said elastic means and in part to said support for damping movement of said elastic means relative to said support, a first signaling device measuring movement of said elastic means, and a second signaling device measuring movement of said damping means.

5. In combination, a single degree of freedom gyroscope including a rotor and spinning means therefor and a gimbal means mounting said rotor for rotational movement, means mounting said gimbal rotor for limited pivotal movement on a support and about an axis normal to the axis of rotation of said rotor, elastic means connected in part to said gimbal means for restraining said limited pivotal movement of said gimbal, damping means connected in part to said elastic means and in part to said support for damping movement of said elastic means relative to said support, a first signaling device measuring movement of said elastic means, a second signaling device measuring movement of said damping means, and a third signaling device measuring movement of said gimbal relative to said support.

6. In combination, a single degree of freedom gyroscope including a rotor and spinning means therefor and a gimbal means mounting said rotor for rotational movement, means mounting said gimbal rotor for limited pivotal movement on a support and about an axis normal to the axis of rotation of said rotor, elastic means connected in part to said gimbal means for restraining said limited pivotal movement of said gimbal, damping means connected in part to said elastic means and in part to said support for damping movement of said elastic means relative to said support, a first signaling device measuring movement of said elastic means, a second signaling device measuring movement of said damping means, a third signaling device measuring movement of said gimbal relative to said support, and torquer means connected to said gimbal and to said support.

7. In combination, a single degree of freedom gyroscope including a rotor and spinning means therefor and a gimbal means mounting said rotor for rotational movement, means mounting said gimbal rotor for limited pivotal movement on a support and about an axis normal to the axis of rotation of said rotor, elastic means connected to said gimbal and restraining said limited pivotal movement of said gimbal, damping means connected to said elastic means and damping movement of said elastic means relative to said support, a first signaling device including a pair of relatively movable parts one of which is attached to said gimbal and the other of which is attached to said elastic means remote from said gimbal and measuring the movement of said elastic means relative to said gimbal, and a second signaling device including a pair of relatively movable parts one of which is attached to said support and the other of which is attached to said elastic means and said damper remote from said gimbal for measuring movement of said damping means relative to said support.

8. In a gyroscope, a rotatable mass and a gimbal means therefor mounting said mass for rotational movement, means mounting said gimbaled mass on a support and including at one extremity of the gimbal a torsion rod and a damping means connected together at one extremity and respectively to said gimbal and to said support, a first signal producing means measuring relative movement of said damping means to produce a displacement signal for said gyroscope, and a second signal producing means measuring relative movement of said torsion rod to produce a rate signal for said gyroscope.

9. In a gyroscope, a rotatable mass and gimbaling means mounting said mass for rotational movement, means mounting said gimbaled mass on a support and including at one extremity an elastic restraint and a two-part viscous damper one part of which is connected to said elastic restraint and the other part of which is connected to said support, a first signal producing means including a pair of relatively movable parts, one part of which is connected to said support and the other part of which is connected to a part of said viscous damper connected to said elastic restraint, and a second signal producing means including a pair of relatively movable parts one part of which is moved by said gimbal and the other part of which is connected to the part of said damper common to said elastic restraint.

10. In a gyroscope, a rotatable mass and gimbal means therefor mounting said mass for rotational movement, means mounting said gimbaled mass on a support and including at one extremity of the gimbal a torsion rod and a damping means connected together at one extremity and respectively to said gimbal and to said support, a first signal producing means measuring relative movement of said damping means to produce a displacement signal for said gyroscope, a second signal producing means measuring relative movement of said torsion rod to produce a rate signal for said gyroscope, and torquer means secured to said support and adapted to apply a torque to said gimbaled mass.

11. In a gyroscope, a rotatable mass and gimbaling means mounting said mass for rotational movement, means mounting said gimbaled mass on a support and including at one extremity an elastic restraint and a two-part viscous damper one part of which is connected to said elastic restraint and the other part of which is connected to said support, a first signal producing means including a pair of relatively movable parts, one part of which is connected to said support and the other part of which is connected to a part of said viscous damper connected to said elastic restraint, a second signal producing means including a pair of relatively movable parts one part of which is moved by said gimbal and the other part of which is connected to the part of said damper common to said elastic restraint, and torquer means secured to said support and adapted to apply a torque to said gimbaled mass.

References Cited in the file of this patent

UNITED STATES PATENTS

| | | |
|---|---|---|
| 2,290,232 | Fischer | July 21, 1942 |
| 2,299,117 | Manteuffel | Oct. 20, 1942 |
| 2,679,366 | Noxon | May 25, 1954 |
| 2,709,921 | Sylvan | June 7, 1955 |